United States Patent
Matsumura et al.

(10) Patent No.: US 11,343,049 B2
(45) Date of Patent: May 24, 2022

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 105 days.

(21) Appl. No.: 16/624,517

(22) PCT Filed: Jun. 23, 2017

(86) PCT No.: PCT/JP2017/023298
§ 371 (c)(1),
(2) Date: Dec. 19, 2019

(87) PCT Pub. No.: WO2018/235299
PCT Pub. Date: Dec. 27, 2018

(65) Prior Publication Data
US 2020/0127795 A1    Apr. 23, 2020

(51) Int. Cl.
*H04L 5/00* (2006.01)
*H04L 1/18* (2006.01)

(52) U.S. Cl.
CPC .......... *H04L 5/0055* (2013.01); *H04L 1/1812* (2013.01)

(58) Field of Classification Search
CPC ................. H04L 5/0055; H04L 1/1812; H04L 27/26025; H04L 27/26136; H04L 1/1692;
(Continued)

(56) References Cited

U.S. PATENT DOCUMENTS 8,699,426 B2 * 4/2014 Gaal .................... H04W 72/04
 370/329
9,408,200 B2 * 8/2016 Kim .................... H04L 5/0048
(Continued)

FOREIGN PATENT DOCUMENTS

EP    3634052 A1    4/2020

OTHER PUBLICATIONS

3GPP TS 36.300 V8.12.0; "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 8)" Mar. 2010 (149 pages).
(Continued)

*Primary Examiner* — Hanh N Nguyen
(74) *Attorney, Agent, or Firm* — Osha Bergman Watanabe & Burton LLP

(57) ABSTRACT

A terminal is disclosed including a transmitter that transmits, in an uplink control channel, uplink control information including a 1-bit Hybrid Automatic Repeat reQuest-Acknowledgement (HARQ-ACK) and a positive Scheduling Request (SR) or a negative SR, and a processor that uses a cyclic shift based on a parameter according to higher layer signaling, and based on the uplink control information, in the transmission of the uplink control information, wherein an interval between two cyclic shifts, each based on two values of uplink control information including the positive SR and the 1-bit HARQ-ACK, is π, and an interval between two cyclic shifts, each based on two values of uplink control information including the negative SR and the 1-bit HARQ-ACK, is π. In other aspects, a radio communication method for a terminal is also disclosed.

6 Claims, 13 Drawing Sheets

(58) Field of Classification Search
CPC ... H04L 1/1861; H04L 1/1671; H04L 5/0053; H04L 1/1854; H04L 5/0051; H04L 27/2607; H04L 5/0048; H04J 13/16; H04W 72/0413; H04W 72/1268; H04W 72/042

See application file for complete search history.

(56) References Cited

U.S. PATENT DOCUMENTS

| | | | | |
|---|---|---|---|---|
| 10,512,070 | B2* | 12/2019 | Shao | H04W 72/04 |
| 2017/0026955 | A1* | 1/2017 | Noh | H04W 72/0446 |
| 2019/0007175 | A1* | 1/2019 | Kwak | H04L 5/0048 |
| 2020/0137789 | A1* | 4/2020 | Matsumura | H04L 27/26 |
| 2020/0170005 | A1* | 5/2020 | Matsumura | H04W 72/0413 |
| 2020/0195387 | A1* | 6/2020 | Matsumura | H04L 1/1854 |
| 2020/0295880 | A1* | 9/2020 | Matsumura | H04W 72/042 |

OTHER PUBLICATIONS

International Search Report issued in International Application No. PCT/JP2017/023298, dated Sep. 19, 2017 (4 pages).
Written Opinion issued in International Application No. PCT/JP2017/023298; dated Sep. 19, 2017 (3 pages).
Office Action issued in the counterpart Japanese Patent Application No. 2019-524857, dated Jul. 14, 2020 (10 pages).
NTT DOCOMO, Inc.; "DMRS-based vs. Sequence-based PUCCH in short duration"; 3GPP TSG RAN WG1 Meeting #88, R1-1702811; Athens, Greece; Feb. 13-17, 2017 (9 pages).
NTT DOCOMO, Inc.; "Sequence-based PUCCH for UCI of up to 2 bits"; 3GPP TSG RAN WG1 NR Ad-Hoc#2, R1-1711098; Qingdao, P.R. China; Jun. 27-30, 2017 (14 pages).
Extended European Search Report issued in Application No. 17915004.0, dated Jan. 12, 2021 (8 pages).
3GPP TSG RAN WG1 Meeting #89; R1-1708470; "Sequence-based PUCCH for UCI of up to 2 bits;" NTT DOCOMO, Inc.; May 15-19, 2017; Hangzhou, P.R. China (8 pages).
Notice of Reasons for Refusal issued in Japanese Application No. 2019-524857, dated Mar. 9, 2021 (6 pages).

* cited by examiner

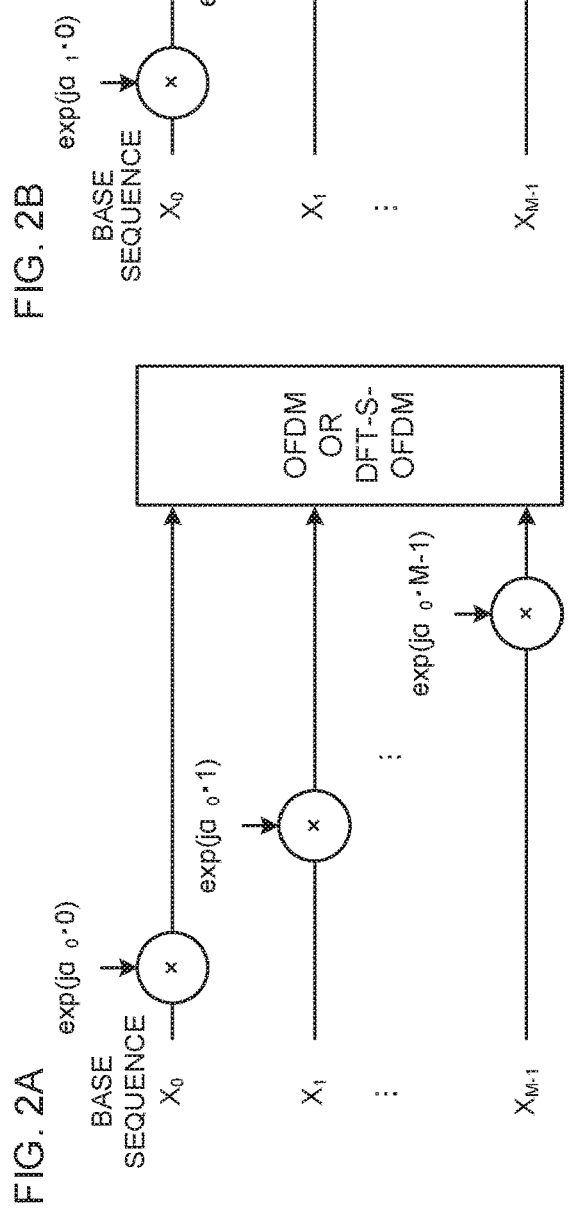
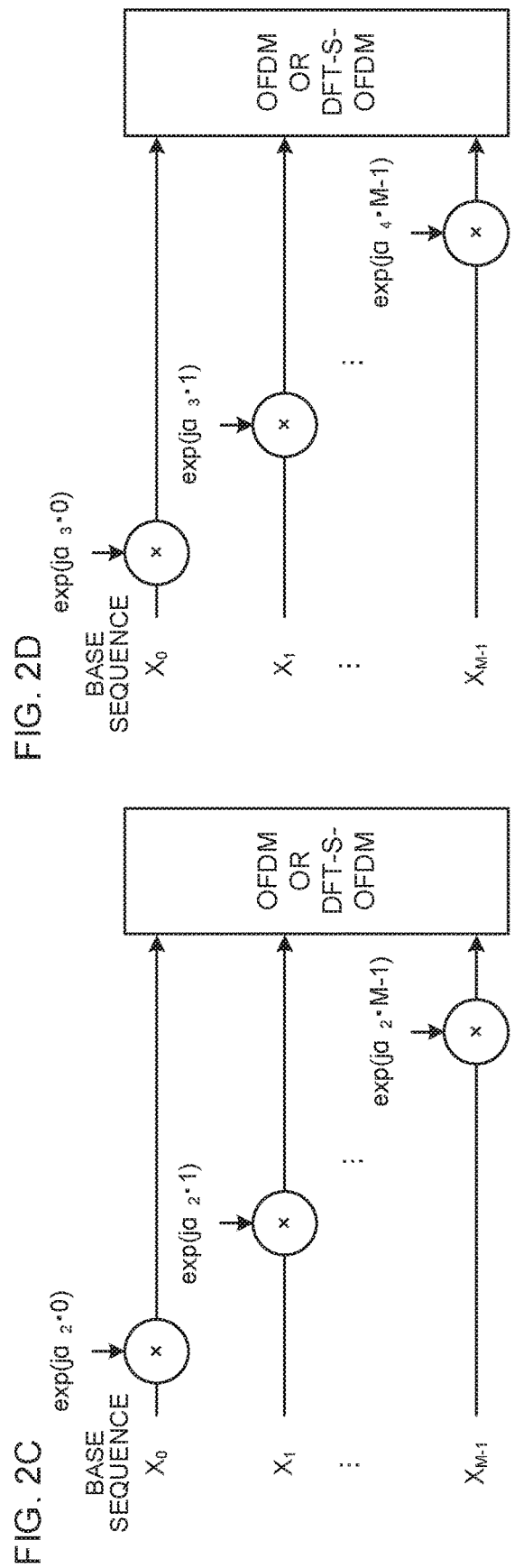
FIG. 2A
FIG. 2B
FIG. 2C
FIG. 2D

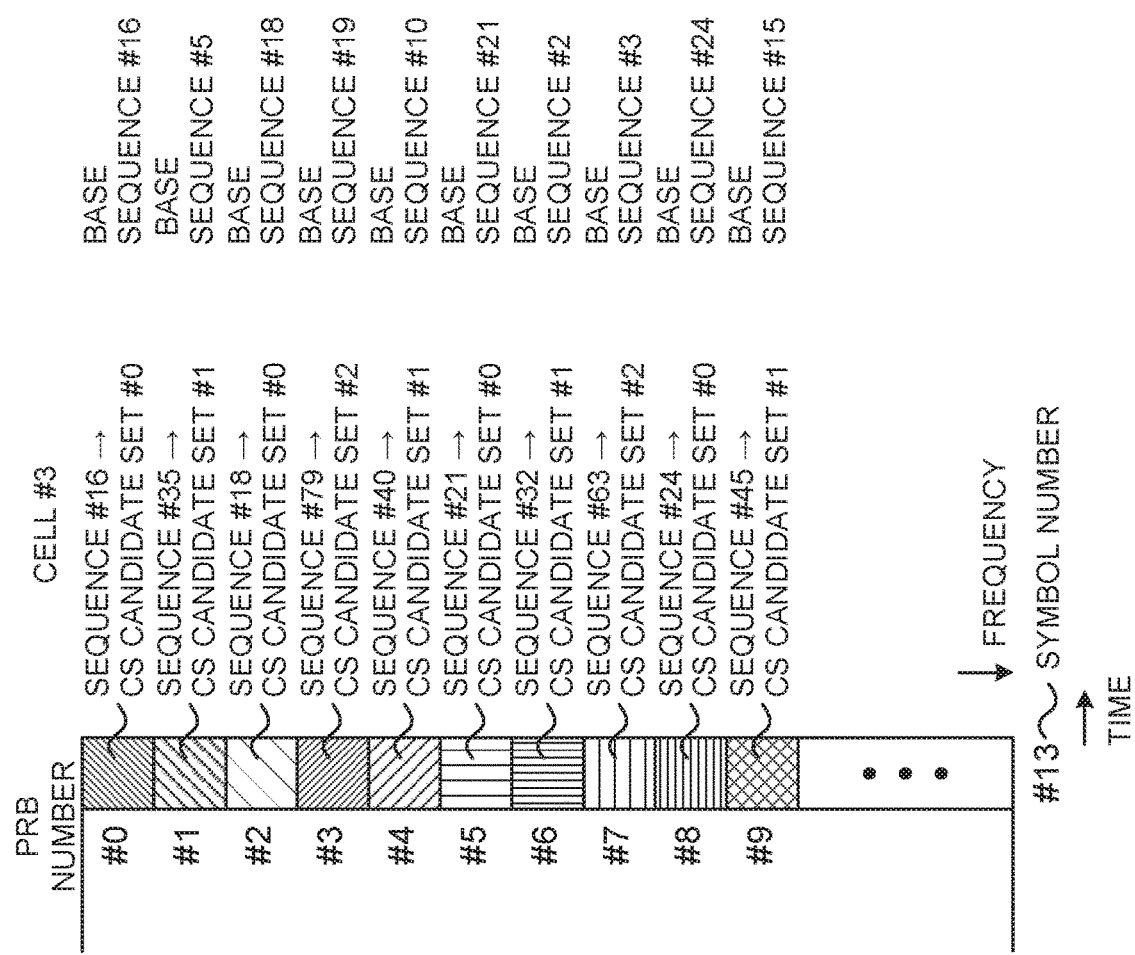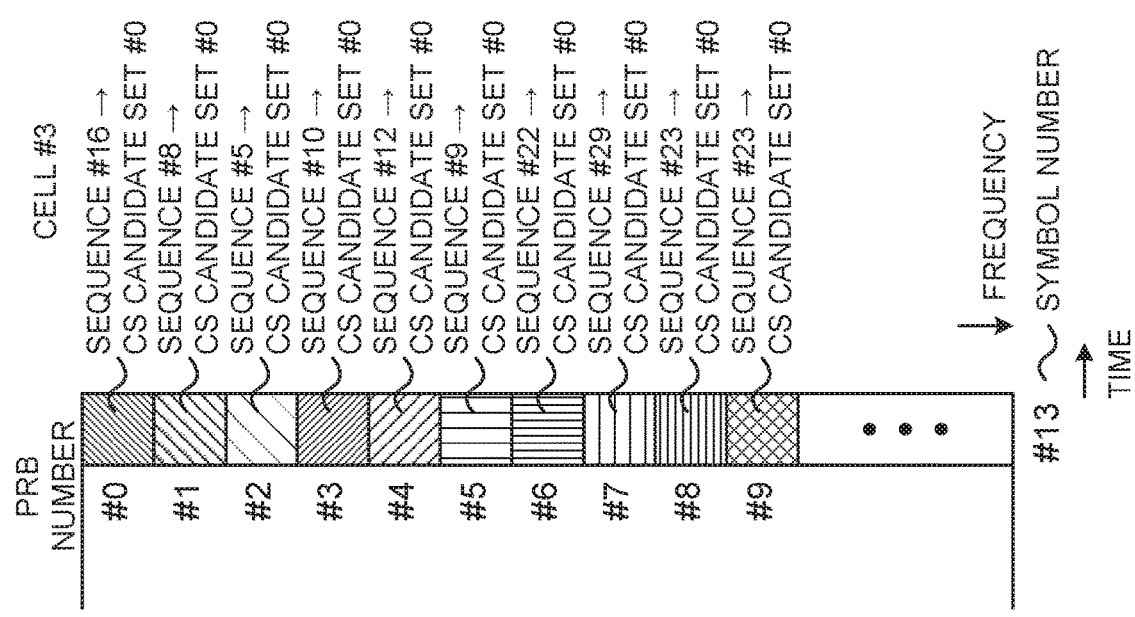

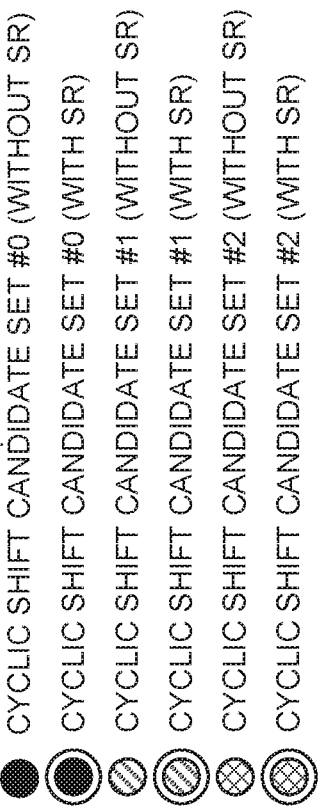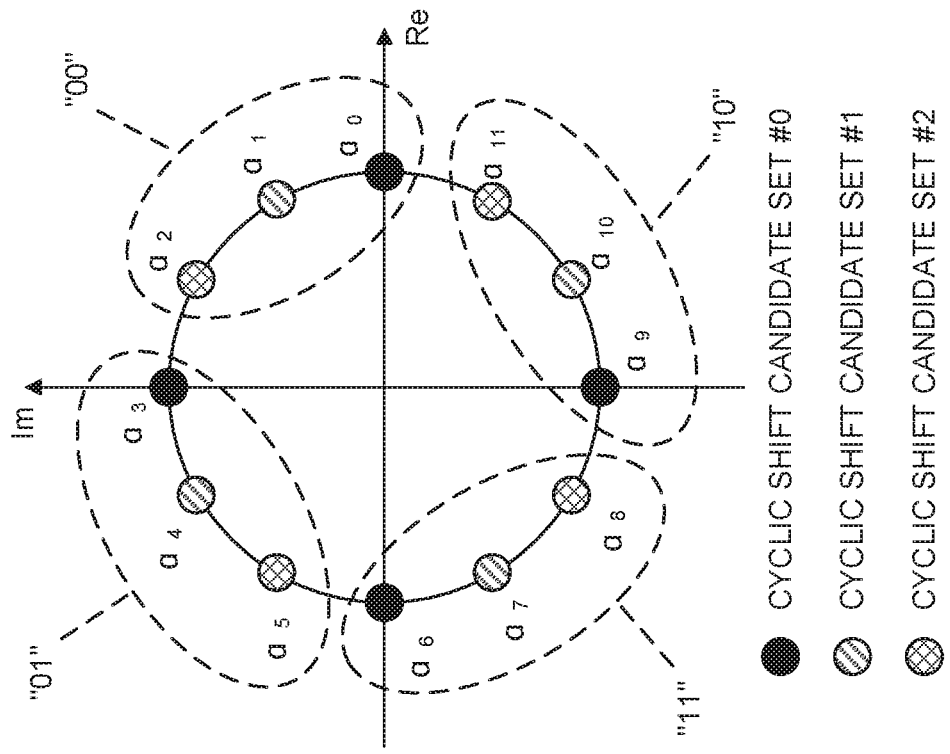
FIG. 7A
FIG. 7B

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "5G+(plus)," "NR (New Radio)," "NX (New radio access)," "FX (Future generation radio access)," "LTE Rel. 13," "LTE Rel. 14," "LTE Rel. 15" or later versions) are under study.

In existing LTE systems (for example, LTE Rel. 8 to 13), downlink (DL) and/or uplink (UL) communication are performed using 1-ms subframes (also referred to as "transmission time intervals (TTIs)" and so on). This subframe is the unit of time it takes to transmit one channel-encoded data packet, and is the processing unit in, for example, scheduling, link adaptation, retransmission control (HARQ (Hybrid Automatic Repeat reQuest)) and so on.

Also, in existing LTE systems (for example, LTE Rel. 8 to 13), a user terminal (UE (User Equipment)) transmits uplink control information (UCI) by using a UL control channel (for example, PUCCH (Physical Uplink Control CHannel)) and/or a UL data channel (for example, PUSCH (Physical Uplink Shared CHannel)). The format of this UL control channel is referred to as "PUCCH format" and so on.

UCI includes at least one of a scheduling request (SR), retransmission control information in response to DL data (DL data channel (PDSCH (Physical Downlink Shared CHannel))) (also referred to as "HARQ-ACK (Hybrid Automatic Repeat reQuest-Acknowledgement)," "ACK," "NACK (Negative ACK)" and so on) and channel state information (CSI).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010. Non-Patent Literature 2: 3GPP TS 36.211 V8.9.0 "Evolved Universal Terrestrial Radio Access (E-UTRA); Physical Channels and Modulation (Release 8)," December, 2009.

SUMMARY OF INVENTION

Technical Problem

Future radio communication systems (for example, 5G, NR, etc.) are expected to realize various radio communication services so as to fulfill different requirements (for example, ultra-high speed, large capacity, ultra-low latency, etc.).

For example, NR is under study to provide radio communication services referred to as "eMBB (enhanced Mobile Broad Band)," "mMTC (massive Machine Type Communication)," "URLLC (Ultra Reliable and Low Latency Communications)," and so on.

Furthermore, for LTE/NR, studies are underway to use UL signals of various formats (UL control channel formats). When applying UL signal transmission methods of existing LTE systems (LTE Rel. 13 or earlier versions) to such future radio communication systems, there is a risk that the coverage, throughput and/or others may deteriorate.

The present invention has been made in view of the above, and it is therefore an object of the present invention to provide a user terminal and a radio communication method, whereby UL signals can be transmitted properly in future radio communication systems.

Solution to Problem

According to one aspect of the present invention, a user terminal has a transmission section that transmits a sequence, which is derived from a base sequence by using a cyclic shift associated with a value of uplink control information, and a control section that controls selection of a set, comprised of a plurality of cyclic shifts that are associated with a plurality of candidate values of the uplink control information, respectively, and the base sequence, based on a parameter that is reported from a radio base station.

Advantageous Effects of Invention

According to the present invention, UL signals can be reported properly in future radio communication systems.

BRIEF DESCRIPTION OF DRAWINGS

FIGS. 2A to 2D are diagrams to show examples of transmission signal generation processes for sequence-based PUCCH;

FIGS. 4A and 4B are diagrams, each showing an example of the sequence selection method according to the first embodiment of the present invention;

FIGS. 7A and 7B are diagrams to show examples of CS candidate sets for sequence-based PUCCHs that transmit two bits;

DESCRIPTION OF EMBODIMENTS

Figure 1A:
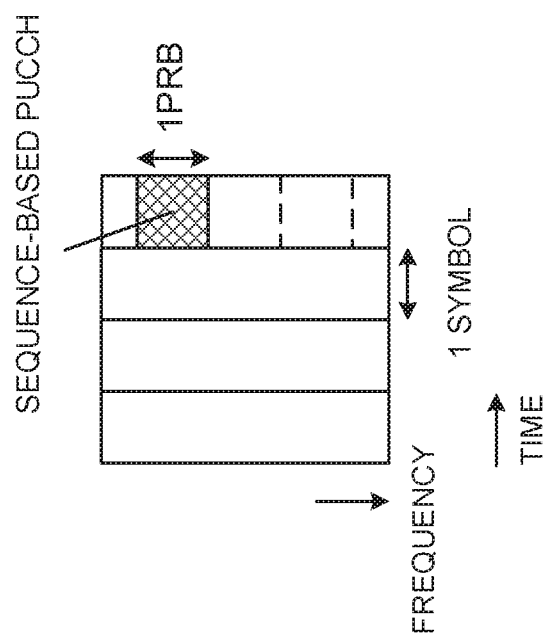
FIGS. 1A and 1B are diagrams to show examples of sequence-based PUCCHs.

Future radio communication systems (for example, LTE Rel. 14, 15 and/or later versions, 5G, NR, etc.) are under study to introduce multiple numerologies, not a single numerology.

Note that a "numerology" may refer to a set of communication parameters that characterize the design of signals in a given RAT (Radio Access Technology), the design of a RAT and so on, or refer to parameters that are defined in the frequency direction and/or the time direction, such as subcarrier spacing (SCS), the duration of symbols, the duration of cyclic prefixes, the duration of subframes, and so forth.

Also, future radio communication systems are under research for introduction of time units (also referred to as "subframes," "slots," "minislots," "subslots," "transmission time intervals (TTIs)," "short TT's (sTTIs)" "radio frames" and so on) that are the same as and/or different than existing LTE systems (LTE Rel. 13 or earlier versions), while supporting multiple numerologies and so on.

Note that TT's may represent time units in which transmitting/receiving data's transport blocks, code blocks, codewords and so on are transmitted and received. Given a TTI, the period of time (for example, the number of symbols) where a transport block, a code block and/or a codeword of data is actually mapped may be shorter than the TTI.

For example, when a given number of symbols (for example, fourteen symbols) constitute a TTI, transmitting/receiving data's transport block, code block and/or codeword can be transmitted and received in a period of one or a given number of symbols in the constituent symbols. If the number of symbols in which a transport block, a code block and/or a codeword of transmitting/receiving data is transmitted and/or received is smaller than the number of symbols constituting a TTI, reference signals, control signals and so forth can be mapped to symbols in the TTI where no data is mapped.

Subframes may serve as time units that have a given time duration (for example, 1 ms), irrespective of which numerology is used by (and/or configured in) a user terminal (for example, UE (User Equipment)).

By contrast with this, slots may serve as time units that depend on the numerology UE uses. For example, if the subcarrier spacing is 15 kHz or 30 kHz, the number of symbols per slot may be seven or fourteen. When the subcarrier spacing is 60 kHz or greater, the number of symbols per slot may be fourteen. In addition, a slot may contain a plurality of minislots (subslots).

Envisaging such future radio communication systems, a study is in progress to support a UL control channel (hereinafter also referred to as a "short PUCCH") that is designed to be shorter in duration (have a shorter duration) than PUCCH (Physical Uplink Control CHannel) formats for existing LTE systems (for example, LTE Rel. 8 to 13) and/or a UL control channel (hereinafter also referred to as a "long PUCCH") that is designed to have be longer in duration (have a longer duration) than the above short duration.

A short PUCCH (also referred to as a "shortened PUCCH") is formed with a given number of symbols (for example, one symbol, two symbols, or three symbols) provided in a given SCS. In this short PUCCH, uplink control information (UCI) and reference signals (RSs) may be time-division-multiplexed (TDM) or frequency-division-multiplexed (FDM). The RSs may include, for example, the demodulation reference signal (DMRS), which is used to demodulate UCI.

The SCS in each symbol of the short PUCCH may be the same as or higher than the SCS in symbols of data channels (hereinafter also referred to as "data symbols"). The data channels may be, for example, a downlink data channel (PDSCH (Physical Downlink Shared CHannel)), an uplink data channel (PUSCH (Physical Uplink Shared CHannel)) and so on.

Hereinafter, whenever "PUCCH" is simply mentioned, this may be read as "short PUCCH" or "PUCCH in short duration."

PUCCH may be time-division-multiplexed (TDM) and/or frequency-division-multiplexed (FDM) with a UL data channel (hereinafter also referred to as "PUSCH") in a slot. Also, PUCCH may be time-division-multiplexed (TDM) and/or frequency-division-multiplexed (FDM) with a DL data channel (hereinafter also referred to as "PDSCH") and/or a DL control channel (hereinafter also referred to as "PDCCH (Physical Downlink Control CHannel)") in a slot.

To provide schemes for transmitting short PUCCHs, a DMRS-based PUCCH (DMRS-based transmission or DMRS-based PUCCH), which reports UCI by transmitting UL signals, in which DMRS and UCI are frequency-division-multiplexed (FDM) and/or time-division-multiplexed (TDM), and a sequence-based PUCCH (or sequence-based transmission), which reports UCI by transmitting UL signals using code resources that are associated with UCI values, without using DMRS, are under study.

A DMRS-based PUCCH transmits a PUCCH that contains the RS for demodulating UCI, and therefore may be referred to as "coherent transmission," "coherent design," and so on. A sequence-based PUCCH reports UCI in a PUCCH that does not contain the RS for demodulating UCI, and therefore may be referred to as "non-coherent transmission," "non-coherent design" and so on.

A code resource for sequence-based PUCCH refers to a resource that can be code-division-multiplexed (CDM), and may be at least one of a base sequence, the amount of cyclic shift (amount of phase rotation) and an OCC (Orthogonal Cover Code). A cyclic shift may be read as a phase rotation.

Information to represent at least one of time resources, frequency resources and code resources for a sequence-based PUCCH may be reported from the network (NW, which is, for example, a radio base station, a gNodeB, etc.) to UE via higher layer signaling (for example, RRC (Radio Resource Control) signaling, MAC (Medium Access Control) signaling, broadcast information (the MIB (Master Information Block), SIBs (System Information Blocks), etc.), physical layer signaling (for example, DCI) or a combination of these.

Base sequences may be CAZAC (Constant Amplitude Zero Auto-Correlation) sequences (for example, Zadoff-Chu sequences), or may be sequences that are equivalent to CAZAC sequences (for example, CG-CAZAC (Computer-Generated CAZAC) sequences), such as ones specified in 3GPP TS 36.211 V8.9.0 § 5.5.1.2 (in particular, table 5.5.1.2-1 and table 5.5.1.2-2).

Now, a case will be described below, in which a sequence-based PUCCH transmits two-bit UCI by using cyclic shifts.

A number of candidate amounts of cyclic shifts (amounts of phase rotation) that may be assigned to one UE will be referred to as a "CS candidate set" (also referred to as a "cyclic shift candidate set," a "cyclic shift amount pattern," a "phase rotation amount candidate set," a "phase rotation amount pattern," and so forth).

Figure 1B:
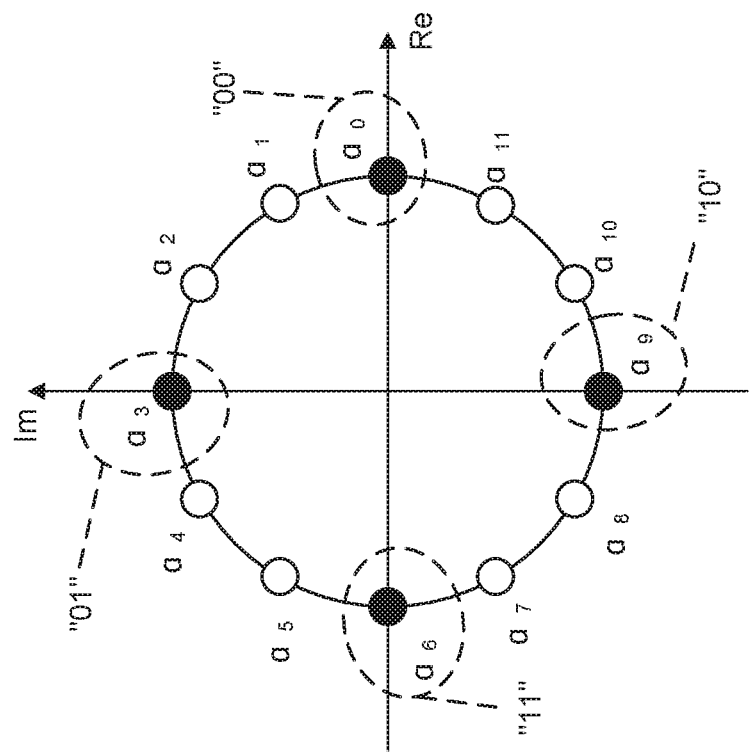

The sequence length of a base sequence is determined by the number of subcarriers M and the number of PRBs (Physical Resource Blocks). When a sequence-based PUCCH is transmitted using a unit band of one PRB, the sequence length of the base sequence is 12 (=12×1). In this case, as shown in FIG. 1B, twelve phase rotation amounts $\alpha_0$ to $\alpha_{11}$, which are provided at phase intervals of $2\pi/12$ (that is, $\pi/6$) are defined. By applying phase rotations (cyclic shifts) to one base sequence based on phase rotation amounts $\alpha_0$ to $\alpha_{11}$, individually, twelve sequences that are orthogonal to each other (with zero cross-correlation) are derived. Note that phase rotation amounts $\alpha_0$ to $\alpha_{11}$ have only to be determined based on at least one of the number of subcarriers M, the number of PRBs and the sequence length of the base sequence. Two or more phase rotation amounts may be selected from these phase rotation amounts $\alpha_0$ to $\alpha_{11}$ and used as cyclic shift candidate set.

A sequence-based PUCCH reports control information, which contains at least one of an ACK/NACK (A/N), CSI and an SR. Note that UCI to indicate an A/N and/or CSI, and the presence of an SR (positive SR), may be referred to as "UCI including an SR," and UCI to indicate an A/N and/or CSI, and the absence of an SR (negative SR), may be referred to as "UCI not including an SR." In the following description, the control information to indicate an A/N and/or CSI will be referred to as "UCI," and the control information to indicate that an SR is present or an SR is absent will be referred to as positive/negative SR.

For example, when UCI is one bit, the UCI values 0 and 1 may correspond to a "NACK" and an "ACK," respectively. For example, when UCI is two bits, the UCI values 00, 01, 11 and 10 may correspond to a "NACK-NACK," a "NACK-ACK," an "ACK-ACK" and an "ACK-NACK," respectively.

As shown in FIG. 1B, when UCI is two bits, among four candidates of two-bit values of UCI, UE rotates the phase of a base sequence based on the amount of phase rotation that corresponds to the value that is transmitted, and transmits the signal of the rotated phase using a given time/frequency resource. The time/frequency resource may be a time resource (for example, a subframe, a slot, a symbol, etc.) and/or a frequency resource (for example, a carrier frequency, a channel band, a CC (Component Carrier), a PRB, etc.).

FIGS. 2A, 2B, 2C, and 2D provide diagrams to show examples of transmission signal generation processes for sequence-based PUCCHs. In these transmission signal generation processes, phase rotations (cyclic shifts) are applied to base sequences X0 to XM-1 of sequence length M, based on selected phase rotation amounts $\alpha$, and the phase-rotated base sequences are input to an OFDM (Orthogonal Frequency Division Multiplexing) transmitter or a DFT-S-OFDM (Discrete Fourier Transform-Spread-Orthogonal Frequency Division Multiplexing) transmitter. The UE transmits output signals from the OFDM transmitter or the DFT-S-OFDM transmitter.

When phase rotation amount candidates $\alpha_0$ to $\alpha_3$ are associated with UCI information candidates 0 to 3 respectively and information 0 is reported as UCI, as shown in FIG. 2A, the UE rotates the phases of base sequences $X_0$ to $X_{M-1}$ based on $\alpha_0$, which is the amount of phase rotation associated with information 0. Similarly, when the UE reports information 1 to 3 as UCI, as shown in FIGS. 2B, 2C and 2D, the UE rotates the phases of base sequences $X_0$ to $X_{M-1}$ based on $\alpha_1$, $\alpha_2$ and $\alpha_3$, which are the phase rotation amounts associated with information 1 to 3, respectively.

Next, decoding of UCI that is reported in a sequence-based PUCCH will be described below. Here, although the receipt detection operation to be carried out when UCI is reported by selecting the amount of phase rotation will be described below, the same operation will apply even when UCI is reported by selecting different types of resources (for example, base sequences, time/frequency resources, etc.) or combinations of multiple types of resources.

The NW may detect UCI from a received signal by using maximum likelihood detection (which may be referred to as "MLD" or "correlation detection"). To be more specific, the network may generate a replica of every amount of phase rotation (phase rotation amount replicas) that is assigned to the user terminal (for example, the network may generate four patterns of phase rotation amount replicas if the length of the UCI payload is two bits), and generate transmission signal waveforms, as the user terminal does, based on the base sequences and the phase rotation amount replicas. Also, the network may calculate the correlation between the transmission signal waveforms derived thus, and the waveform of the signal as received from the user terminal, for all the phase rotation amount replicas, and assume that the phase rotation amount replica to show the highest correlation has been transmitted.

To be more specific, the network may multiply each element of received signal sequences of size M after the DFT (M complex-number sequences) by complex conjugates of transmission signal sequences (M complex-number sequences), which are given by applying phase rotations to the base sequence of the transmission signal based on phase rotation amount replicas, and assume that the phase rotation amount replica, where the resultant absolute value (or the square of the absolute values) of the sum of the M sequences is the largest, has been sent.

Alternatively, the network may generate transmission signal replicas to match the maximum number of phase rotation amounts that can be assigned (twelve for one PRB), and estimate the amount of phase rotation to yield the highest correlation with the received signal, based on the same operation as the MLD-based operation described above. If the estimated amount of phase rotation is different from the ones assigned, the network may assume that the amount of phase rotation that is closest to the estimated amount of phase rotation, among the assigned phase rotation amounts, has been transmitted.

The base station, for example, detects the value of UCI and the positive/negative SR by executing MLD on the received sequence-based PUCCH.

In LTE, the number of cell IDs is 504, and, based on these cell IDs, reference signals (for example, DMRS) to be associated with PUCCH or PUSCH are selected from thirty sequences. Research is underway to design NR so that the number of cell IDs will increase to approximately 1000 (about twice). Accompanying this increase of the number of cell IDs, it is preferable to increase the number of sequences for use for sequence-based PUCCHs as well.

In LTE, the number of base sequences for use for reference signals less than six PRBs is thirty. In NR, it is difficult to double the number of base sequences when the number of cell IDs increases. The number of Zadoff-Chu sequences is (the maximum prime number less than or equal to the sequence length−1), and, for example, the number of Zadoff-Chu sequences of sequence length 60 corresponding to five PRBs (sixty subcarriers) is fifty eight, and the number of sequences cannot be sixty. Also, it is difficult to find CGSs (Computer-Generated Sequences) in sequence lengths corresponding to one to five PRBs, respectively.

Thus, problems arise in how to configure a large number of sequences for use in the uplink. So, the present inventors have studied ways to configure sequences for uplink, and arrived at the present invention.

This method can be applied to signals that use sequences derived by applying cyclic shifts to base sequences. For example, this method may be applied to sequences that are used for sequence-based PUCCHs, or may be applied to sequences for use for reference signals (for example, DMRS) that are associated with PUCCH or PUSCH.

Now, embodiments of the present invention will be described in detail below with reference to the accompanying drawings. Note that the radio communication methods according to these embodiments may be applied individually or may be applied in combination.

(Radio Communication Method)

First Embodiment

According to the first embodiment of the present invention, UE chooses the base sequence and the CS candidate set to use for a sequence-based PUCCH based on a sequence index (number) i that is reported from the NW. The sequence index i may be configured in the UE via higher layer signaling.

The UE may choose a base sequence index j, which specifies a base sequence, and a CS candidate set index Y, which specifies a CS candidate set, based on sequence index i.

In the event the sequence-based PUCCH has time/frequency resources of one symbol/one PRB (twelve subcarriers), the length of the base sequence is twelve, so that the total number of CS candidates is twelve.

Figure 3:
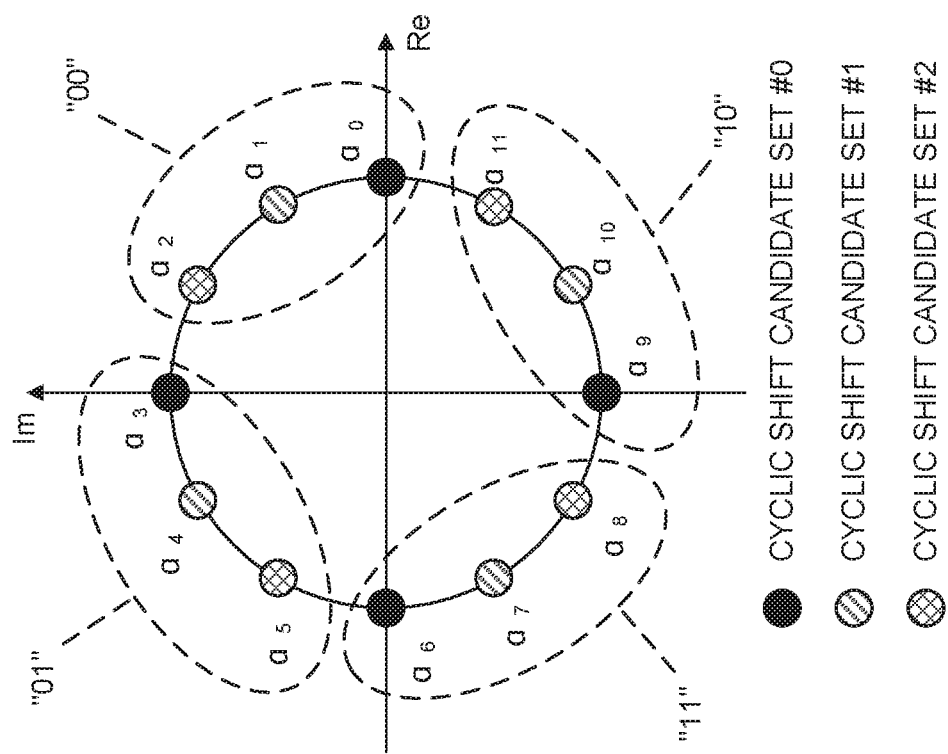
FIG. 3 is a diagram to show examples of CS candidate sets.

Here, when the length of the UCI payload is two bits, as shown in FIG. 3, the number of CS candidates that are assigned per UE (the number of UCI value candidates), or "R," is four. Assuming that four CS candidates assigned to each UE constitute a CS candidate set, the number of CS candidate sets that can be used (the total number of CS candidates/the number of CS candidates per UE, or "R"), or "S," is three.

Here, M base sequences and S CS candidate sets may be combined, so that the number of sequences that are available for use, or "N," is M×S (the maximum number of sequences that can be code-division-multiplexed (CDM)). If the number of base sequences M is thirty and the number of CS candidate sets S is three, the number of sequences available for use, N, is ninety. The NW may assign one of these ninety sequences to each UE, so that sequence-based PUCCHs from multiple UEs can be code-division-multiplexed (CDM) in the same time/frequency resource (symbol/PRB).

The UE may determine CS candidate set index Y based on a parameter m and the number of CS candidate sets S. m may be determined by the UE based on a cell ID (a cell identifier, a cell index, and so forth), or m may be reported via higher layer signaling. For example, m is Mod (cell ID, S). Here, Mod (a, b) represents the remainder of a divided by b (modulo, or the remainder of dividing a by b).

The UE may choose the CS candidate set selection method based on which range sequence index i belongs to. Sequence index i can assume values between 0 and S×M1, based on the number of base sequences M and the number of CS candidate sets S. In this case, the range of sequence index i may be divided into S partial ranges, including M sequence indices, and the method of choosing CS candidate sets may be determined per partial range. Each CS candidate set selection method may be represented by an equation using m and the number of CS candidate sets S.

If a partial range index p, which ranges from 0 to S−1, indicates partial ranges, partial range index p corresponds to p×M to (p+1)×(M−1) partial ranges, and the CS candidate set selection methods for these partial ranges may be Y=Mod (m+p, S). Here, instead of the number of base sequences M, a value that is smaller than M may be used, or, instead of the number of CS candidate sets S, a value that is smaller than S may be used.

For example, if the number of sequences available for use, N, is ninety, the UE may assume that sequence index i is one between 0 and 89. The CS candidate set selection method is Y=Mod (m, S) when sequence index i is included between 0 and 29, the CS candidate set selection method is Y=Mod (m+1, S) when sequence index i is included between 30 and 59, and the CS candidate set selection method is Y=Mod (m+2, S) when sequence index i is included between 60 and 89.

The UE may choose base sequence index j based on sequence index i and the number of base sequences M. For example, base sequence index j is Mod (i, M).

When parameter m is based on cell IDs, the UE can choose CS candidate sets based on cell IDs, thereby preventing the use of the same CS candidate set in two cells that neighbor each other. Therefore, the cross-correlation between two cell's sequences can be kept low, and the communication quality of sequence-based PUCCHs can be prevented from deteriorating.

FIGS. 4A and 4B show a sequence selection method, where the number of base sequences M is thirty, the length of the UCI payload is two bits, and sequence-based PUCCHs are allocated to each of ten consecutive PRBs in one symbol.

As shown in FIG. 4A, the NW configures the range of sequence indices to assign to UE from 0 to 29 (that is, configures the number of sequences that are available for use, N, to thirty), so that the cross-correlation between sequences can be kept low, and the communication quality of sequence-based PUCCHs can be prevented from deteriorating. If CS candidate set indices are provided based on cell IDs, the possibility of neighboring cells using overlapping CS candidate sets can be reduced (by increasing the distance between cells that use the same CS candidate set), and the cross-correlation of sequences between these cells can be kept low. In this case, each cell has only one limited CS candidate set within it, so that the distance (phase) between CS candidates can be increased, and, even when there is severe frequency selectivity, the cross-correlation between sequences in each cell can be kept low.

In FIG. 4A, the cell ID is 3, so that m is 0, and CS candidate set index Y is 0 in all PRBs. Base sequence index j in this case is equal to sequence index i.

As shown in FIG. 4B, the NW configures the range of sequence indices to assign to UE from 0 to 89 (that is, configures the number of sequences that can be used, N, to ninety), so that multiple CS candidate sets can be configured in one cell, and the number of UEs to multiplex can be increased.

In FIG. 4B, a CS candidate set is selected for each PRB, based on which range the reported sequence index belongs to. Therefore, cases might occur where different CS candidate sets are used in the same cell. Base sequence index j is the remainder of sequence index i divided by the base sequence.

In this way, the NW can configure sequence index i in a flexible manner, based on the situation.

The UE may choose parameter m based on at least one of the cell ID, the PRB index (PRB number), the symbol index (symbol number) and the beam index. The PRB index may be the minimum PRB index and/or the maximum PRB index in the frequency resources for the sequence-based PUCCH. The symbol index may indicate the time resource for the sequence-based PUCCH. The beam index may indicate the beam that is used to transmit the sequence-based PUCCH.

Instead of a PRB index, a piece of information to specify another frequency resource (which may be a band, a component carrier and so forth) may be used. Instead of a symbol index, a piece of information to specify another time resource (which may be a subframe, a slot, a minislot and so forth) may be used.

Parameter m may be determined based on the combination of a cell ID, a PRB index, and a symbol index. For example, parameter m may be determined based on Mod (cell ID+PRB index+symbol index, N).

Base sequence index j and/or CS candidate set index Y may hop based on a given hopping pattern.

When the length of the UCI payload is one bit, the number of CS candidates assigned per UE is two. The total number of CS candidates is twelve, so that the number of CS candidate sets that are available for use is Six.

The number of base sequences M may be configured in the UE via higher layer signaling.

For example, if the bandwidth of the sequence-based PUCCH (the number of PUCCH PRBs) is one to five PRBs, the number of base sequences M may be configured to thirty or sixty. If no report with an indication of the number of base sequences M arrives via higher layer signaling, the UE may assume that the number of base sequences M is thirty. When the bandwidth of the sequence-based PUCCH is six PRBs or more, the UE may assume that the number of base sequences M is sixty.

The UE may choose the number of base sequences M based on the number of PUCCH PRBs or the sequence length configured by the NW.

For example, if the number of PUCCH PRBs is one to five, the UE may assume that the number of base sequences M is thirty. Otherwise, the UE assumes that the number of base sequences M is 60. For example, the UE may assume that the number of base sequences M is thirty if the number of PUCCH PRBs is one or two. Otherwise, the UE assumes that the number of base sequences M is (the maximum prime number, which is equal to or less than the base sequence length). To be more specific, if the number of PUCCH PRBs is one or two, the UE may assume that the base sequence is an LTE-CGS. Otherwise, the UE assumes that the base sequence is a Zadoff-Chu sequence.

Similar to the UE, the NW may choose base sequence index j and CS candidate set index Y from sequence index i reported. By this operation, the NW can specify base sequences and CS candidate sets, and receive sequence-based PUCCHs.

According to the first embodiment described above, the NW configures one of multiple combinations of base sequences and CS candidate sets in UE, so that it is possible to reduce the possibility that sequences overlap within cells and/or between cells.

Second Embodiment

According to a second embodiment of the present invention, the number of sequences available for use, N, is configured in UE via higher layer signaling and/or broadcast information. The number of sequences that are available for use, N, can be rephrased as "the number of combinations that can be used" among the combinations of base sequences and CS candidate sets.

For example, the number of sequences available for use, N, may be based on the number of base sequences M. For example, one of M, 2M and 3M may be designated by the NW as N. The NW may report information to indicate N to the UE, or report information to indicate N/M to the UE.

Assuming that the multiplier t for M is ranges from 1 to S, the number of sequences available for use, N, may be given by t×M.

The UE may choose sequence index i in a range of 0 to N−1 based on at least one of the cell ID, the PRB index, the symbol index, and the beam index.

For example, sequence index i may be determined based on Mod (cell ID, N), may be determined based on Mod (PRB index, N), or may be determined based on Mod (symbol index, N).

Also, the sequence index i may be determined by combining cell ID, the PRB index, and the symbol index. For example, the sequence index i may be determined based on Mod (cell ID+PRB index+symbol index, N).

The UE may determine CS candidate set index Y based on the cell ID. For example, CS candidate set index Y may be Mod (cell ID, S).

The UE may determine CS candidate set index Y based on at least one of the cell ID, the PRB index, the symbol index and the beam index. For example, CS candidate set index Y may be given by Mod (cell ID+PRB index+symbol index, S).

The UE may choose base sequence index j based on the sequence index i and the number of base sequences M. For example, base sequence index j is Mod (i, M).

By configuring the number of sequences available for use, N, to be less than or equal to a given value (for example, N is M), the NW can keep the cross-correlation between sequences low, and prevent the communication quality of sequence-based PUCCHs from deteriorating. Further, the NW can increase the number of UEs to multiplex by configuring the number of sequences available for use, N, to be larger than a given value (for example, N is 3M).

In this way, the NW can configure the number of sequences available for use, N, in a flexible manner, based on the situation.

Base sequence index j and/or CS candidate set index Y may hop based on a given hopping pattern.

Figure 5A:
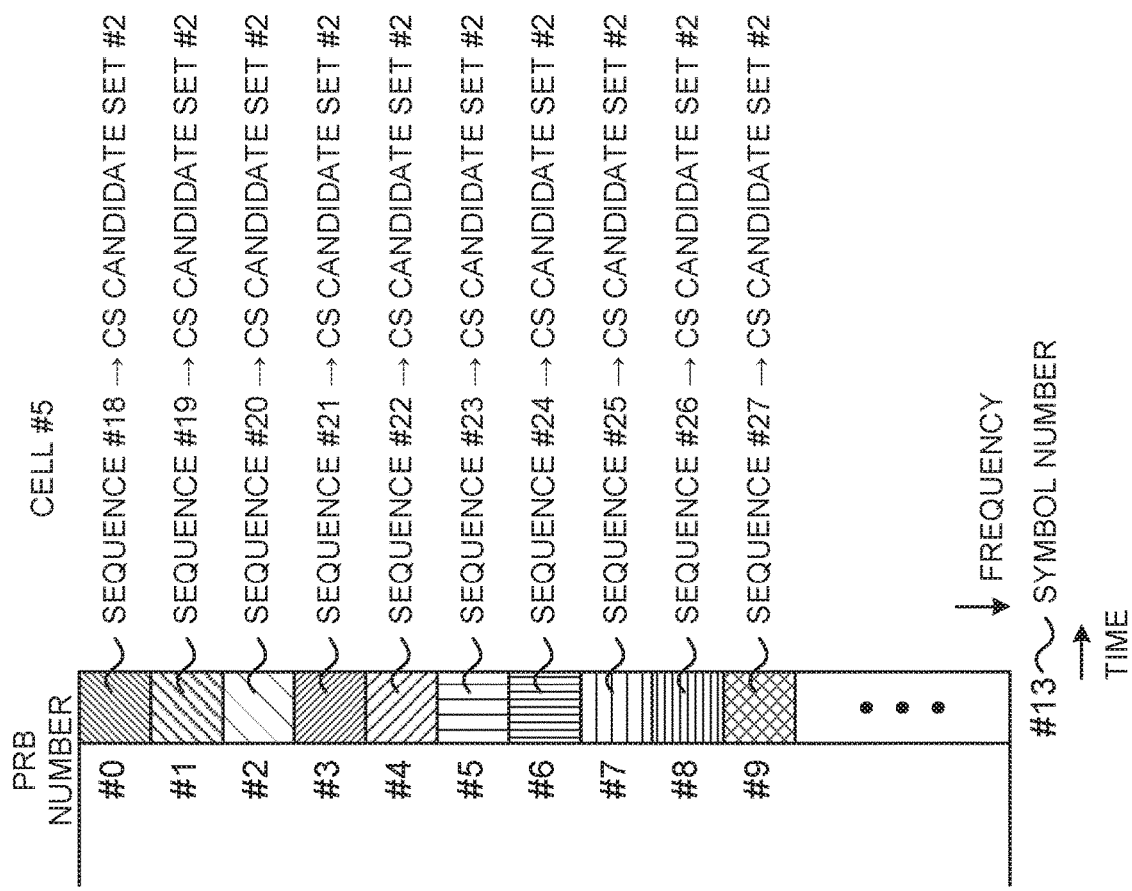
FIGS. 5A and 5B are diagrams, each showing an example of the sequence selection method according to a second embodiment of the present invention.
Figure 5B:
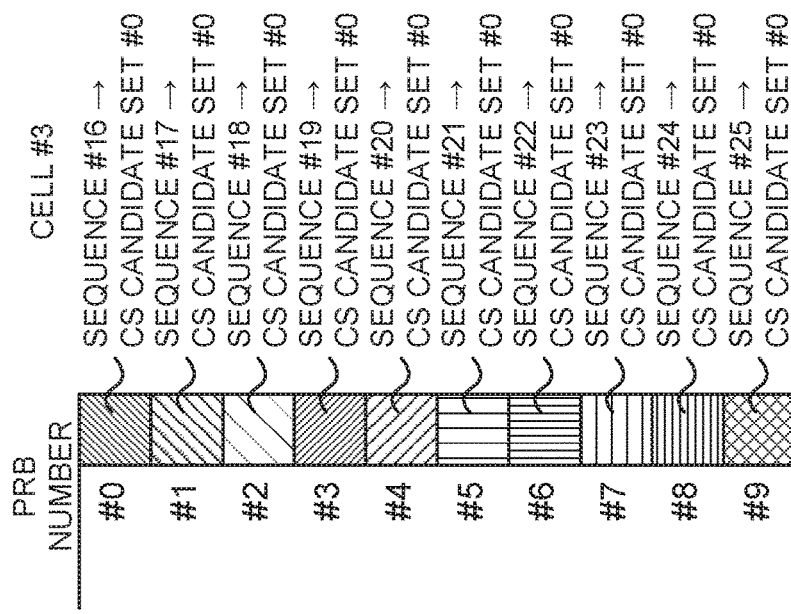

FIGS. 5A and 5B show a sequence selection method, where, in a symbol in which the number of base sequences M is thirty, the length of the UCI payload is two bits, the number of sequences that are available for use, N, is thirty, and the symbol index is 13, sequence-based PUCCHs are allocated to each of ten consecutive PRBs. Here, assume that sequence index i is derived from Mod (cell ID+PRB index+symbol index, N) and CS candidate set index Y is derived from Mod (cell ID, S).

FIG. 5A shows a cell with a cell ID of 3, and FIG. 5B shows a cell with a cell ID of 5. Therefore, CS candidate set index Y varies between these cells. Also, between these cells, sequence index i varies even in PRBs where the PRB index and the symbol index are the same. Base sequence index j in this case is equal to sequence index i.

If the number of sequences available for use, N, is ninety, sequence index i ranges from 0 to 89, so that different CS candidate sets may be used in the same cell.

The NW may choose base sequence index j and CS candidate set index Y based on the reported number of available sequences N, the cell ID and/or the resource of the sequence-based PUCCH, like the UE does. By this operation, the NW can identify base sequences and CS candidate sets, and receive sequence-based PUCCHs.

According to the above second embodiment, since the UE determines the sequence index i, it is possible to reduce the amount of information reported from the NW compared with the first embodiment.

Third Embodiment

According to a third embodiment of the present invention, a CS candidate set index is configured from the NW to UE via higher layer signaling.

CS candidate set index Y and base sequence index j may be each configured in UE. For example, CS candidate set index Y ranges from 0 to S−1, and base sequence index j ranges from 0 to M−1.

The NW may limit the range of CS candidate set index Y, which is reported to the UE. For example, the NW limits the range of CS candidate set index Y, so that the cross-correlation between sequences can be kept low, and the communication quality of sequence-based PUCCHs can be prevented from deteriorating. For example, the NW can increase the number of UEs to multiplex by not limiting the range of CS candidate set index Y.

In this way, the NW can configure CS candidate sets in UEs in a flexible manner, based on the situation.

For example, when CS candidate sets #1, #2 and #3 are available for use, the NW may limit the CS candidate set in a certain cell to #1, the cross-correlation between the sequence used in this cell and sequence used in neighboring cells can be kept low.

The NW performs the process of assigning CS candidate sets. For example, it is preferable to limit the CS candidate set to #1 in a certain cell, limit the CS candidate set to #2 in a nearby cell, and limit the CS candidate set to #3 in another nearby cell. To do so, a plurality of NWs need to share the CS candidate set index that is used in each cell.

According to the third embodiment, a NW assigns CS candidate set index Y and base sequence index j to UE, so that the impact on the specification is limited.

Fourth Embodiment

CS candidate sets will be described below in detail with a fourth embodiment of the present invention.

Here, show the CS candidate set for sequence-based PUCCH consisting of one symbol/one PRB.

When a sequence-based PUCCH reports one bit of UCI, each CS candidate set includes two CS candidates, and the number of CS candidate sets S is six. In each CS candidate set, the distance (phase gap) between CS candidates is the maximum.

Figure 6:
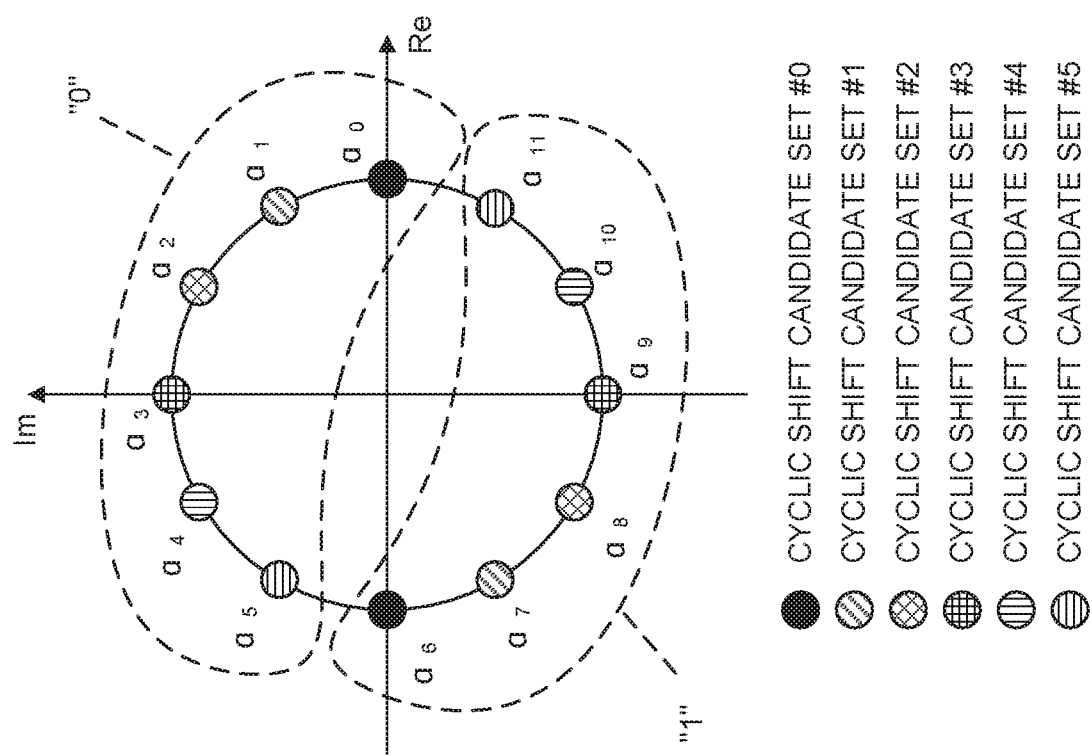
FIG. 6 is a diagram to show examples of CS candidate sets for sequence-based PUCCHs that transmit one bit.

For example, as shown in FIG. 6, CS candidate set #0 includes $\alpha_0$ and $\alpha_6$, CS candidate set #1 includes $\alpha_1$ and $\alpha_7$, CS candidate set #2 includes $\alpha_2$ and $\alpha_8$, CS candidate set #3 includes $\alpha_3$ and $\alpha_9$, CS candidate set #4 includes $\alpha_4$ and $\alpha_{10}$, CS candidate set #5 includes $\alpha_5$ and $\alpha_{11}$. Two CS candidates in each CS candidate set correspond to UCI values 0 and 1, respectively. In each CS candidate set, the gap between CS (phase rotation amount) candidates is $\pi$.

In this way, each CS candidate set includes two CS candidates that are six CS candidates apart, so that the gap between two subcarriers has a constant value, regardless of CS candidates. The NW can use this value as a reference signal (for example, a DMRS).

When a sequence-based PUCCH reports two bits of UCI, or when a sequence-based PUCCH reports UCI and the positive/negative SR, each one bit and two bits in total, each CS candidate set includes four CS candidates, and the number of CS candidate sets S is three. In each CS candidate set, the distance (phase gap) between CS candidates is the maximum. CS candidate sets like these will be referred to as "first CS candidate sets." That is, in each first CS candidate set, a number of CS candidates are provided at equal intervals.

For example, as shown in FIG. 7A, CS candidate set #0 includes $\alpha_0$, $\alpha_3$, $\alpha_6$ and $\alpha_9$, CS candidate set #1 includes $\alpha_1$, $\alpha_4$, $\alpha_7$ and $\alpha_{10}$, and CS candidate set #2 includes $\alpha_2$, $\alpha_5$, $\alpha_8$ and $\alpha_{11}$. The four CS candidates in each CS candidate set correspond to the UCI values 00, 01, 11 and 10, respectively. In each CS candidate set, the gap between CS (phase rotation amount) candidates is $\pi/2$.

As described above, each CS candidate set includes four CS candidates that are three CS candidates apart, so that the gaps among four subcarriers assume a constant value, regardless of CS candidates. The NW can use this value as a reference signal (for example, as a DMRS). In this case, the NW may perform channel estimation using the DMRS, or demodulate UCI using this DMRS.

When a sequence-based PUCCH reports UCI and the positive/negative SR, each one bit and two bits in total, each CS candidate set includes four CS candidates, and the number of CS candidate sets S is three. In each CS candidate set, the distance (phase gap) between CS candidates corresponding to different UCI values is maximized, and the CS candidates corresponding to the positive/negative SR neighbor each other. CS candidate sets like these will be referred to as "second CS candidate sets." That is, in each second CS candidate set, a number of CS candidates are provided at irregular intervals.

For example, referring to FIG. 7B, CS candidate set #0 includes $\alpha_0$, $\alpha_1$, $\alpha_6$ and $\alpha_7$, CS candidate set #1 includes $\alpha_2$, $\alpha_3$, $\alpha_8$ and $\alpha_9$, CS candidate set #2 includes $\alpha_4$, $\alpha_5$, $\alpha_{10}$ and $\alpha_{11}$. The four CS candidates in each CS candidate set correspond to the UCI value 0 and negative SR, the UCI value 0 and positive SR, the UCI value 1 and negative SR and the UCI value 1 and positive SR, respectively. CS (phase rotation amount) candidates corresponding to different UCI values are provided at intervals of $\pi$, and CS candidates corresponding to the positive/negative SR are $\pi/6$ apart.

The requirement for the error rate of UCI may be more stringent than the requirement for the error rate of the positive/negative SR. In second CS candidate sets, the gap between two CS candidates that correspond to different UCI values is larger than the gap between two CS candidates that correspond to the positive/negative SR, so that in an environment where the frequency selectivity is severe (channel delay spread is significant), the error rate of UCI can be lowered compared to the first CS candidate sets.

When a sequence-based PUCCH reports UCI and the positive/negative SR (for example, when reporting one bit of UCI and the positive/negative SR), the NW may configure a first CS candidate set or a second CS candidate set in the UE via higher layer signaling. The UE may transmit the sequence-based PUCCH using the CS candidate set that is configured.

According to the fourth embodiment described above, a CS candidate set corresponding to the length of the UCI payload and/or the required error rate of the UCI can be used.

Fifth Embodiment

Methods of selecting sequences apart from sequence-based PUCCHs will be described below with a fifth embodiment of the present invention. For example, UE may select sequences for reference signals (for example, DMRS) associated with the PUCCH or the PUSCH.

The UE may choose at least one of sequence index i, base sequence index j, and CS candidate set index Y in the same way as in the first embodiment. Note that, the UE may choose at least one of sequence index i, base sequence index j and CS candidate set index Y in the same way as in the second or the third embodiment.

In the first to fourth embodiments, where there are CS candidates that are chosen for a sequence-based PUCCH, the UE uses the CS candidate that is associated with the value of UCI. In the fifth embodiment, the UE chooses CS candidates to use for a sequence apart from a sequence-based PUCCH, and applies cyclic shifts to base sequences by using these chosen CS candidates. Now, a first CS candidate selection method and a second CS candidate selection method for choosing CS candidates will be described below.

According to the first CS candidate selection method, a CS candidate may be configured in the UE via higher layer signaling.

For example, a CS candidate index Z to indicate one CS candidate may be reported from the NW to the UE. In the case of FIG. 7A, CS candidate index Z is one of 0 to 11. Also, CS candidate set index Y and information to specify a CS candidate in a CS candidate set may be reported. For example, if the number of CS candidates in a CS candidate set, R, is four, information to designate a CS candidate may be one of 0 to 3.

According to the first CS candidate selection method, the NW assigns CS candidates to the UE, so that CS candidates can be assigned to the UE, flexibly, based on the situation.

According to the second CS candidate selection method, the UE may determine CS index Z based on at least one of the cell ID, the PRB index, the symbol index and the beam index. The PRB index may be the minimum PRB index and/or the maximum PRB index in the frequency resources that are used to transmit the sequence. The symbol index may indicate the time resource that is used to transmit the sequence. The beam index may indicate the beam that is used to transmit the sequence.

For example, CS candidate index Z may be derived from Y+S×Mod (cell ID+symbol index+PRB index, R) based on the number of CS candidate sets S and the number of CS candidates R.

According to the second CS candidate selection method, the UE selects CS candidates, thereby reducing the amount of information which the NW reports. When CS candidates are based on cell IDs, it is possible to reduce the possibility that CS candidates overlap between neighboring cells.

(Radio Communication System)

Now, the structure of the radio communication system according to one embodiment of the present invention will be described below. In this radio communication system, communication is performed using one or a combination of the radio communication methods according to the herein-contained embodiments of the present invention.

Figure 8:
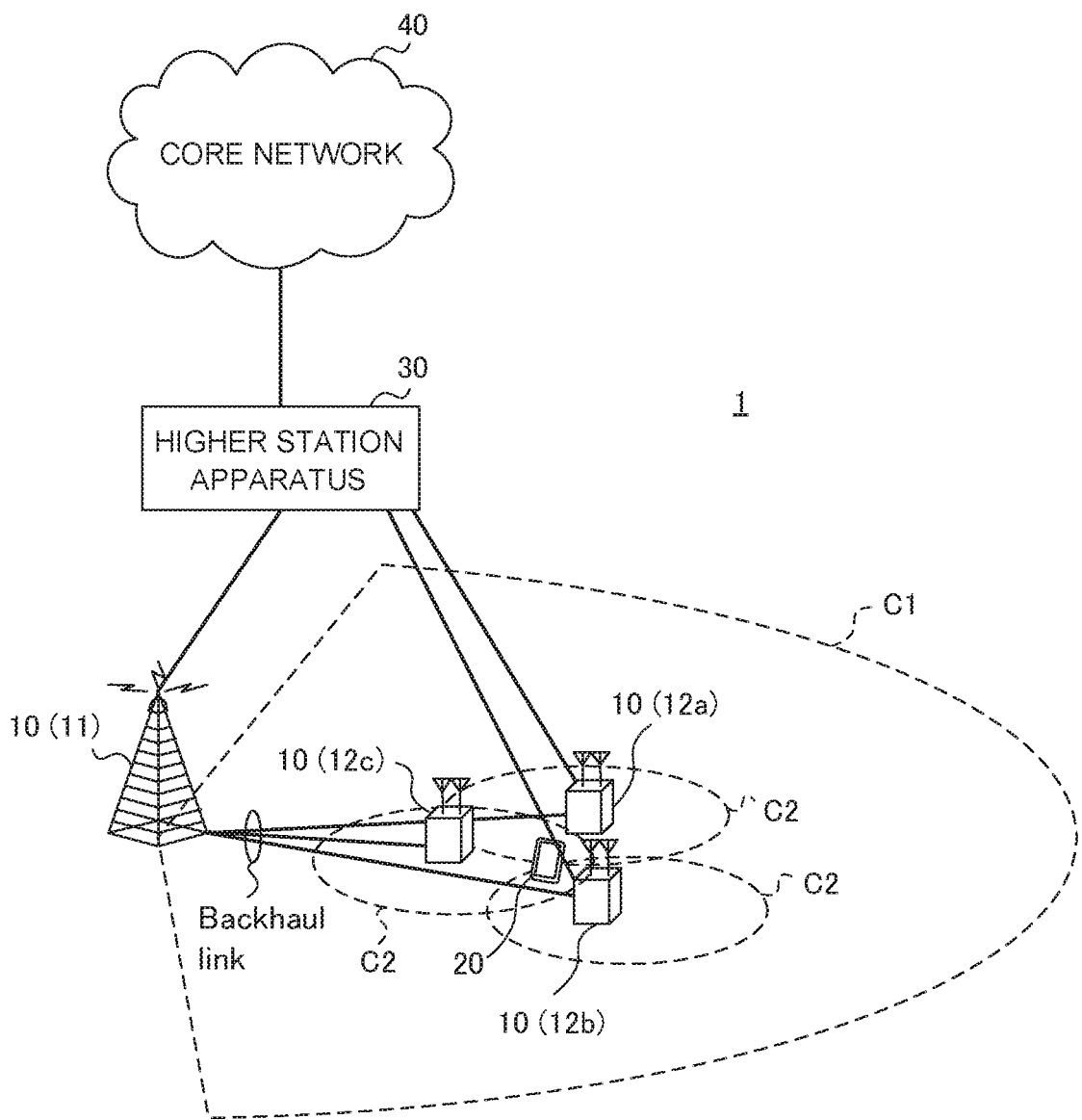
FIG. 8 is a diagram to show an exemplary schematic structure of a radio communication system according to one embodiment of the present invention.

FIG. 8 is a diagram to show an exemplary schematic structure of a radio communication system according to one embodiment of the present invention. A radio communication system 1 can adopt carrier aggregation (CA) and/or dual connectivity (DC) to group a number of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)," and so on, or may be seen as a system to implement these.

The radio communication system 1 includes a radio base station 11 that forms a macro cell C1, with a relatively wide coverage, and radio base stations 12a to 12c that are placed within the macro cell C1 and that form small cells C2, which are narrower than the macro cell C1. Also, user terminals 20 are placed in the macro cell C1 and in each small cell C2. The arrangement, number and so on of cells and user terminals 20 are not limited to those illustrated in the drawings.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a number of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, optical fiber, which is in compliance with the CPRI (Common Public Radio Interface), the X2 interface, and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a number of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a number of terminals to use mutually different bands. Note that the radio access schemes for the uplink and the downlink are not limited to this combination, and other radio access schemes may be used as well.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and/or PUSCH scheduling information, is communicated by the PDCCH.

Note that scheduling information may be reported via DCI. For example, DCI to schedule receipt of DL data may be referred to as "DL assignment," and DCI to schedule transmission of UL data may be referred to as "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACK," "ACK/NACK," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRS (Sounding Reference Signal)), demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 9:
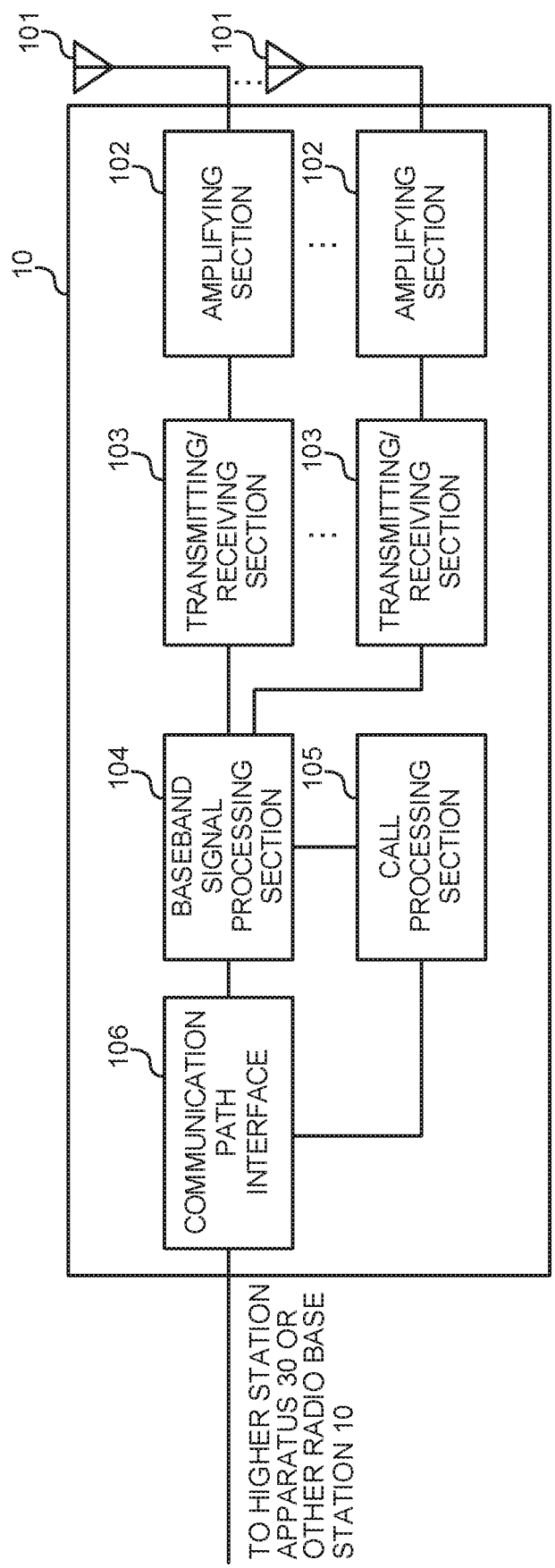
FIG. 9 is a diagram to show an exemplary overall structure of a radio base station according to one embodiment of the present invention.

FIG. 9 is a diagram to show an exemplary overall structure of a radio base station according to one embodiment of the present invention. A radio base station 10 has a number of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a given interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Also, the transmitting/receiving sections 103 may receive a sequence (for example, a sequence-based PUCCH) derived from a base sequence by using a cyclic shift that is associated with the value of uplink control information (UCI).

Also, a parameter for use for choosing a base sequence and/or a CS candidate set for a sequence-based PUCCH (for example, at least one of a sequence index, the number of sequences that are available for use, a cell ID, information to indicate the frequency resource for the sequence-based PUCCH and information to indicate the time resource for the sequence-based PUCCH) may be transmitted from the transmitting/receiving sections 103 to user terminals 20.

Figure 10:
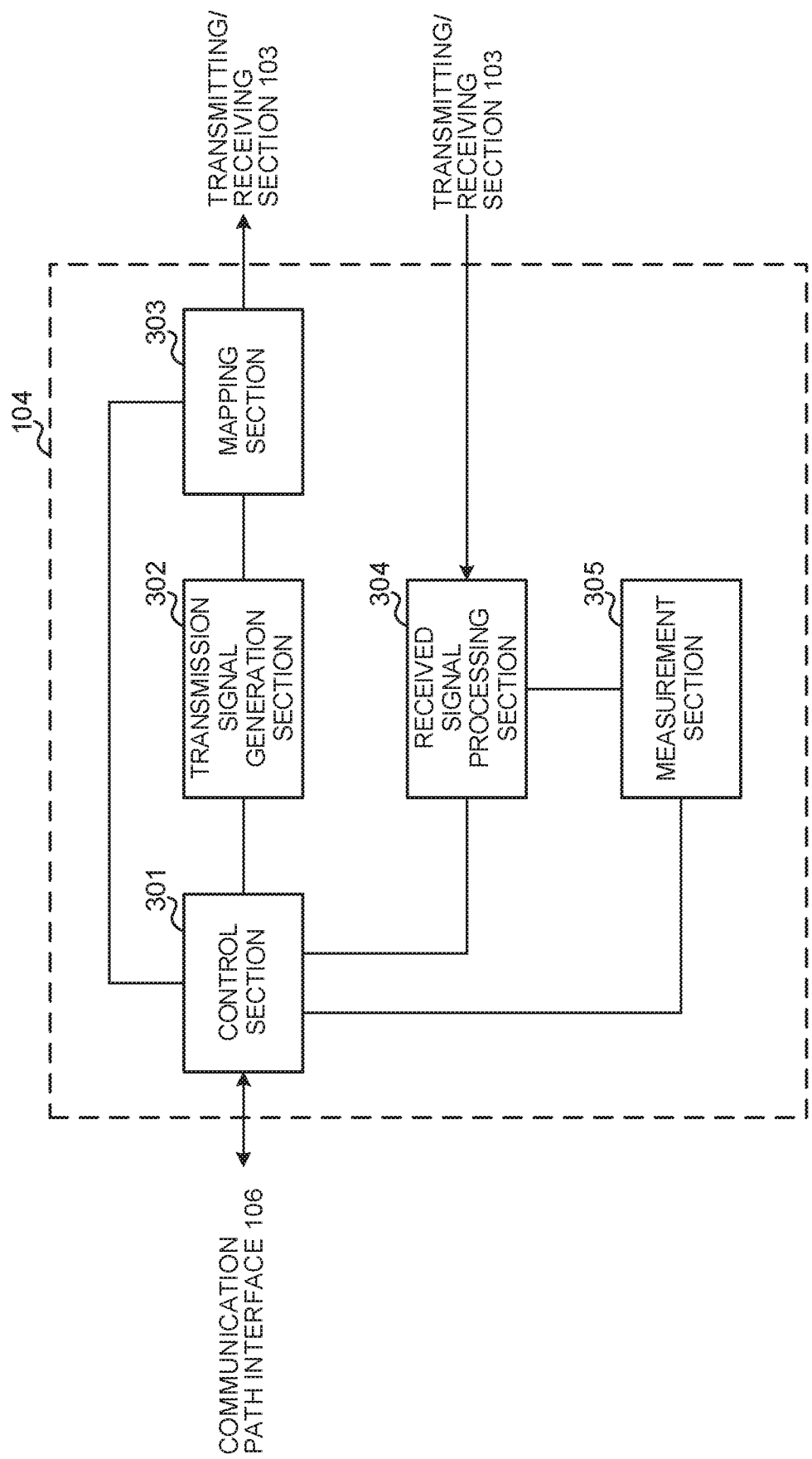
FIG. 10 is a diagram to show an exemplary functional structure of a radio base station according to one embodi

FIG. 10 is a diagram to show an exemplary functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH) and downlink control signals (for example, signals transmitted in the PDCCH and/or the EPDCCH, such as delivery acknowledgment information). The control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DM-RS, etc.) and so on.

The control section 301 controls the scheduling of uplink data signals (for example, signals transmitted in the PUSCH), uplink control signals (for example, signals transmitted in the PUCCH and/or the PUSCH, such as delivery acknowledgment information), random access preambles (for example, signal transmitted in the PRACH), uplink reference signals, and so forth.

The transmission signal generation section 302 generates downlink signals (downlink control signals, downlink data signals, downlink reference signals and so on) as commanded from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, as commanded from the control section 301. DL assignments and UL grants are both DCI, and follow the DCI format. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to given radio resources as commanded from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information, acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), the signal strength (for example, RSSI (Received Signal Strength Indicator)), transmission path information (for example, CSI), and so on. The measurement results may be output to the control section 301.

Also, the control section 301 may allocate radio resources for sequence-based PUCCHs. Also, the control section 301 may assign sequence indices for sequence-based PUCCHs.

(User Terminal)

Figure 11:
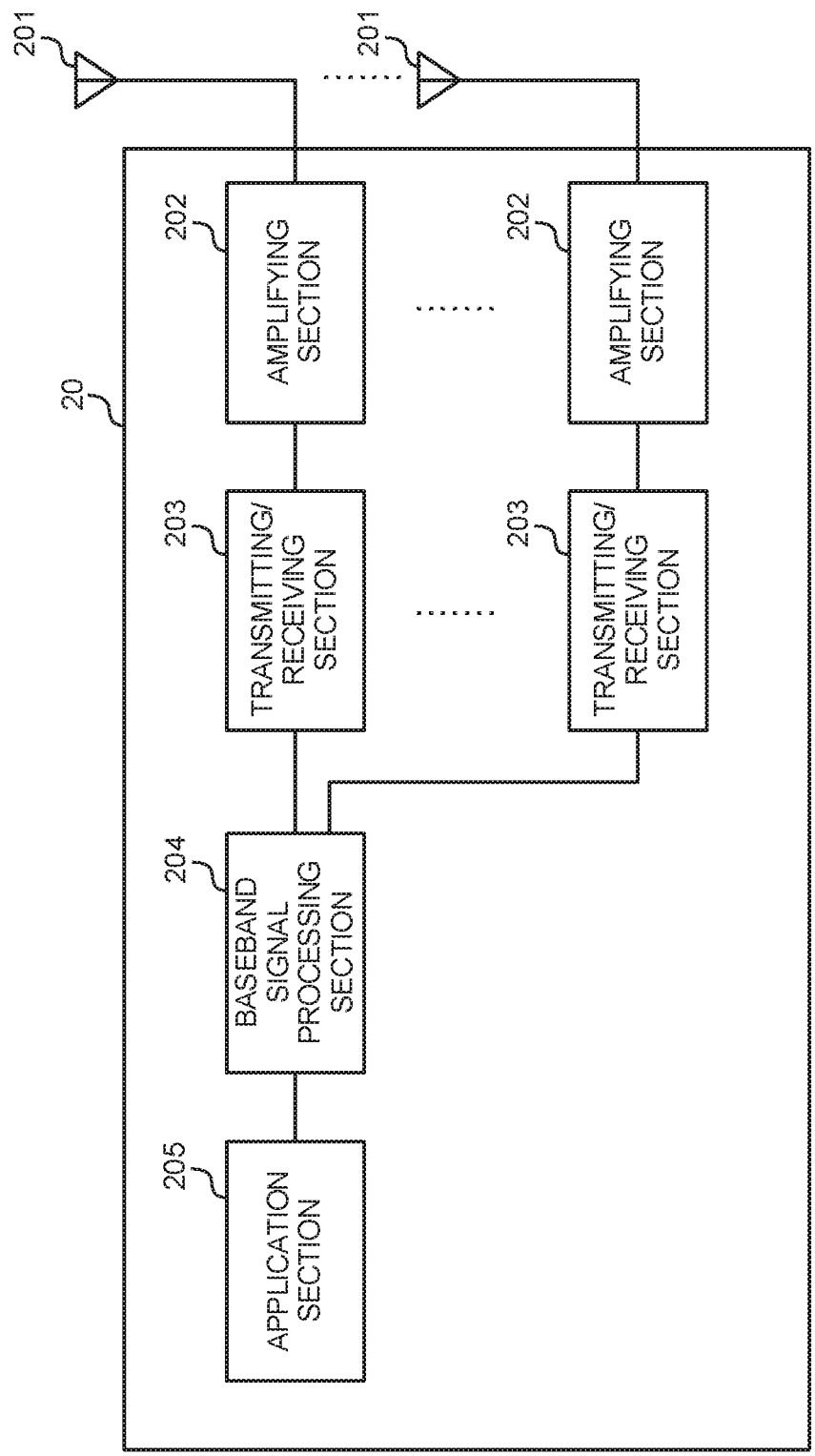
- FIG. 11 is a diagram to show an exemplary overall structure of a user terminal according to one embodiment of the present invention.

FIG. 11 is a diagram to show an exemplary overall structure of a user terminal according to one embodiment of the present invention. A user terminal 20 has a number of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Also, the transmitting/receiving sections 203 may transmit sequences (for example, sequence-based PUCCHs) derived from a base sequence by using cyclic shifts associated with the values of uplink control information (UCI).

Also, the transmitting/receiving sections 203 may receive parameters for use for choosing base sequences and/or CS candidate sets for sequence-based PUCCHs from the radio base station 10.

Figure 12:
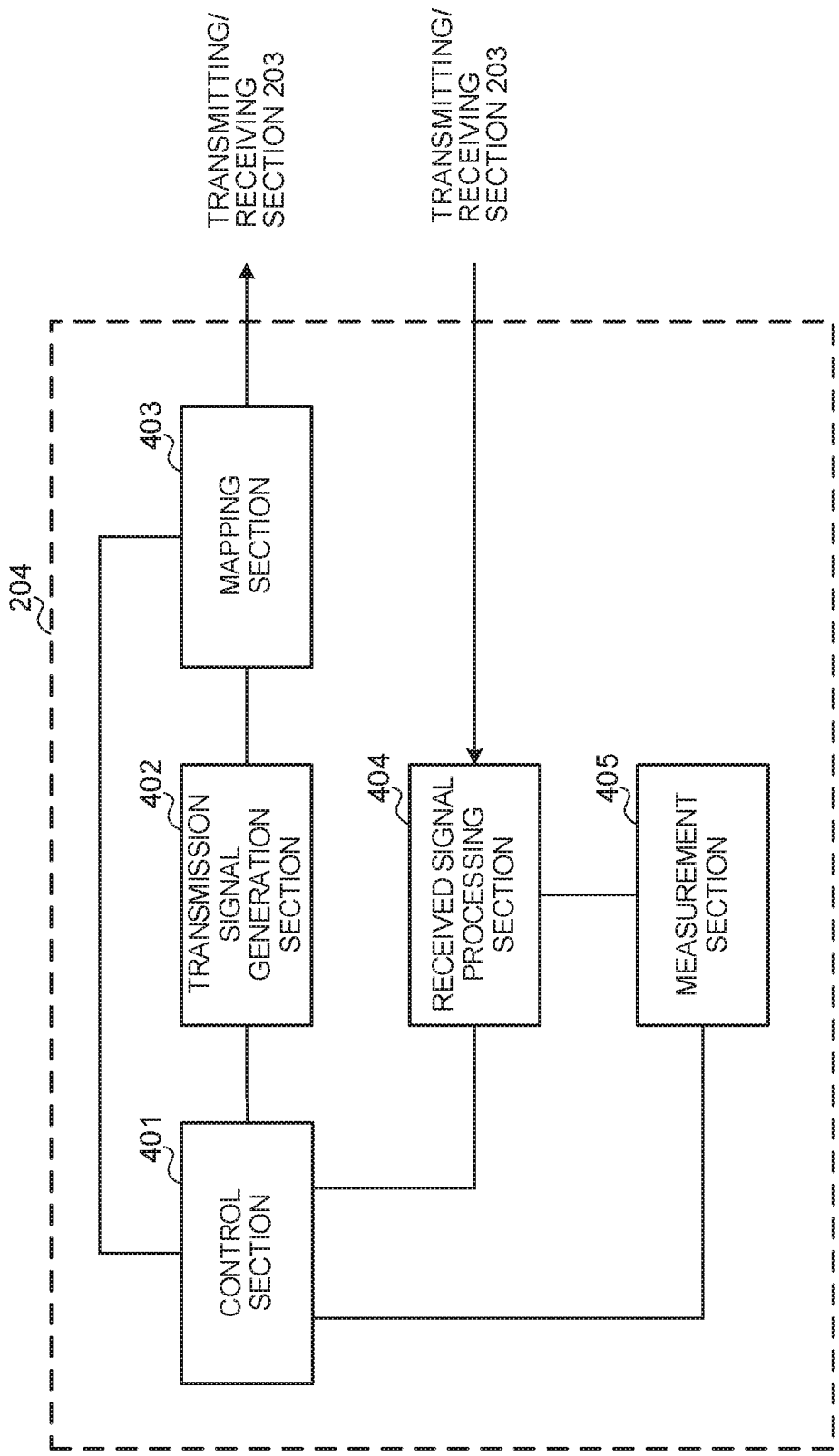
FIG. 12 is a diagram to show an exemplary functional structure of a user terminal according to one embodiment of the present invention.

FIG. 12 is a diagram to show an exemplary functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

Furthermore, when various kinds of information reported from the radio base station 10 are acquired via the received signal processing section 404, the control section 401 may update the parameters to use in control based on these pieces of information.

The transmission signal generation section 402 generates uplink signals (uplink control signals, uplink data signals, uplink reference signals, etc.) as commanded from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, as commanded from the control section 401. Also, the transmission signal generation section 402 generates uplink data signals as commanded from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources as commanded from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements and so on based on the received signals. The measurement section 405 may measure the received power (for example, RSRP), the received quality (for example, RSRQ, SINR, etc.), the signal strength (for example, RSSI), transmission path information (for example, CSI), and so on. The measurement results may be output to the control section 401.

Furthermore, the control section 401 may control, based on a parameter reported from the radio base station, selection of a set (for example, a CS candidate set), which is comprised of a plurality of cyclic shifts associated with a plurality of uplink control information candidates, respectively, and a base sequence.

Also, the number of values the parameter (for example, the sequence index) might assume (for example, the number of sequences that are available for use, N), may be a multiple of the number of base sequences (for example, the number of base sequences M). In addition, the control section 401 may choose a set by using the selection method (for example, a CS candidate set selection method) that is associated with the range (which may be, for example, a partial range) where the parameter is included.

Also, the control section 401 may choose a set based on the parameter and a cell identifier.

In addition, the parameter may be the number of combinations of base sequences and sets that can be used (for example, the number of sequences that are available for use), and may be a multiple of the number of base sequences.

Also, the control section 401 may control selection of the base sequence and the set based on the parameter and at least one of the cell identifier, the frequency resource (for example, the PRB index) allocated to the sequence, and the time resource (for example, the symbol index) allocated to the sequence.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically integrated, or may be realized by directly and/or indirectly connecting two or more physically and/or logically separate pieces of apparatus (via wire or wireless, for example) and using these multiple pieces of apparatus.

Figure 13:
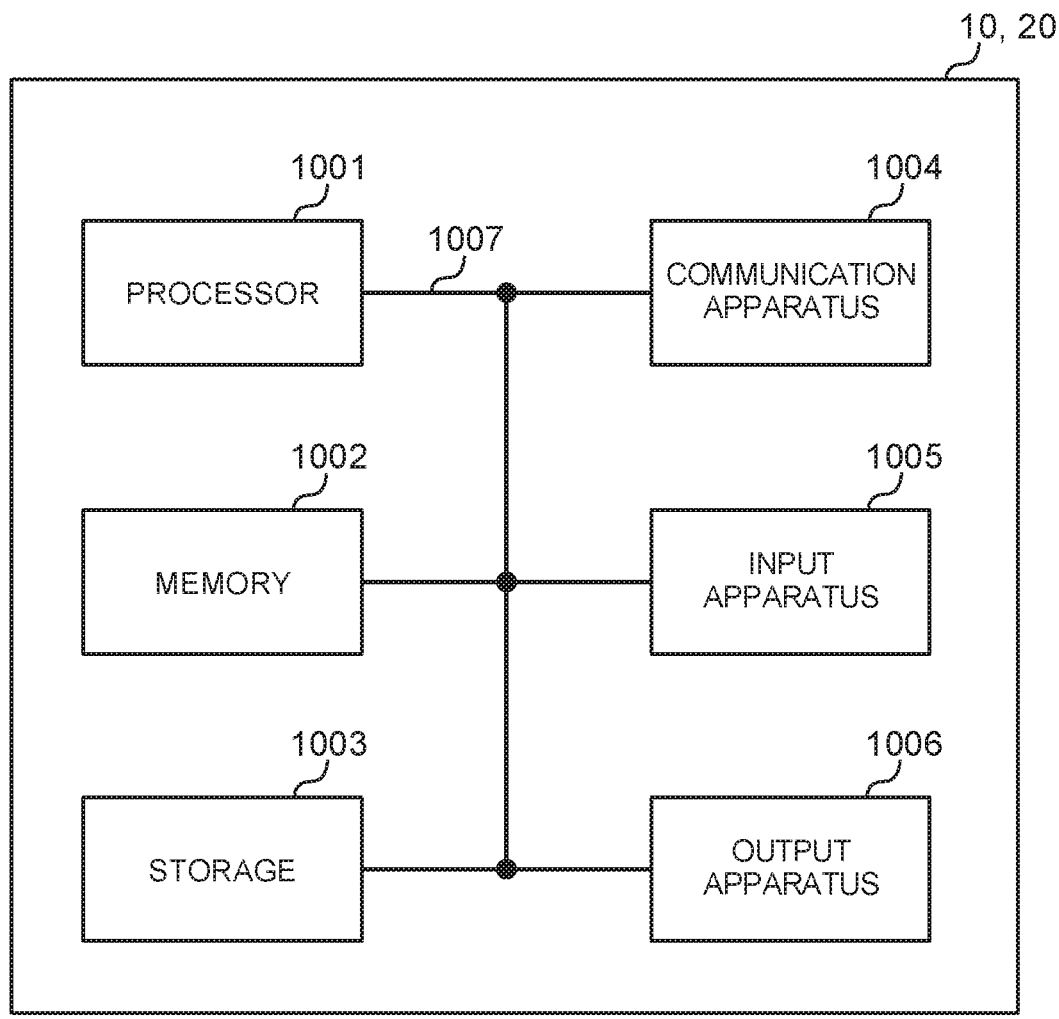
FIG. 13 is a diagram to show an exemplary hardware structure of a radio base station and a user terminal according to one embodiment of the present invention.

For example, the radio base station, user terminals and so on according to embodiments of the present invention may function as a computer that executes the processes of the radio communication method of the present invention. FIG. 13 is a diagram to show an exemplary hardware structure of a radio base station and a user terminal according to one embodiment of the present invention. Physically, the above-described radio base stations 10 and user terminals 20 may be formed as computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawing, or may be designed not to include part of the apparatus.

For example, although only one processor 1001 is shown, a number of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading given software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, registers and so on. For example, the above-described baseband signal processing section 104 (204), call processing section 105 and others may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and/and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented using at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, 1 ms) that does not depend on numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a number of minislots. Each mini-slot may consist of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, one subframe may be referred to as a "transmission time interval (TTI)," or a number of consecutive subframes may be referred to as a "TTI," or one slot or minislot may be referred to as a "TTI." That is, a subframe and/or a TTI may be a subframe (1 ms) in existing LTE, may be a shorter period than 1 ms (for example, one to thirteen symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TT's is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when one slot or one minislot is referred to as a "TTI," one or more TT's (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI (or a "fractional TTI")," a "shortened subframe," a "short subframe," a "minislot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a number of consecutive subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, minislots, symbols and so on described above are merely examples. For example, configurations pertaining to the number of subframes included in a radio frame, the number of slots per subframe or radio frame, the number of minislots included in a slot, the number of symbols and RBs included in a slot or a minislot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to given values, or may be represented using other applicable information. For example, a radio resource may be specified by a given index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of given information (for example, reporting of information to the effect that "X holds") does not necessarily have to be sent explicitly, and can be sent implicitly (for example, by not reporting this piece of information, by reporting another piece of information, and so on).

Decisions may be made in values represented by one bit (0 or 1), may be made in Boolean values that represent true or false, or may be made by comparing numerical values (for example, comparison against a given value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station,"

"access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a number of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by its higher nodes (upper nodes). In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access."

As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency regions, microwave regions and optical regions (both visible and invisible).

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
a processor that controls a hopping of a cyclic shift by determining the cyclic shift based on a first index according to higher layer signaling, based on a value of uplink control information, based on a symbol index of an uplink control channel, and based on a cell ID; and
a transmitter that transmits, in the uplink control channel, a sequence obtained by the cyclic shift of a base sequence,
wherein the value of the uplink control information is one of a first value, a second value, a third value, and a fourth value, the first value indicates 1-bit Hybrid Automatic Repeat request-Acknowledgement (HARQ-ACK), value 0 and negative Scheduling Request (SR), the second value indicates 1-bit HARQ-ACK value 0 and positive SR, the third value indicates 1-bit HARQ-ACK value 1 and negative SR, and the fourth value indicates 1-bit HARQ-ACK value 1 and positive SR, wherein the first value, the second value, the third value, and the fourth value correspond to four candidates of a second index, respectively, wherein the four candidates include 0, 3, 6, and 9, wherein the second index is one candidate corresponding to the value of the uplink control information among the four candidates, and wherein the cyclic shift is based on a result obtained by multiplying a sum of the first index and the second index by $\pi/6$.

2. The terminal according to claim 1, wherein the processor performs a hopping of the base sequence.

3. The terminal according to claim 1, wherein the processor determines the base sequence based on a modulo obtained by dividing the cell ID by an integer value.

4. The terminal according to claim 1, wherein the processor determines the base sequence based on a modulo obtained by dividing a number signaled by a higher layer signaling by an integer value.

5. A radio communication method for a terminal comprising:

controlling a hopping of a cyclic shift by determining the cyclic shift based on a first index according to higher layer signaling, based on a value of uplink control information, based on a symbol index of an uplink control channel, and based on a cell ID; and transmitting, in the uplink control channel a sequence obtained by the cyclic shift of a base sequence, wherein the value of the uplink control information is one of a first value, a second value, a third value, and a fourth value, the first value indicates 1-bit Hybrid Automatic Repeat request-Acknowledgement (HARQ-ACK), value 0 and negative Scheduling Request (SR), the second value indicates 1-bit HARQ-ACK value 0 and positive SR, the third value indicates 1-bit HARQ-ACK value 1 and negative SR, and the fourth value indicates 1-bit HARQ-ACK value 1 and positive SR, wherein the first value, the second value, the third value, and the fourth value correspond to four candidates of a second index, respectively, wherein the four candidates include 0, 3, 6, and 9, wherein the second index is one candidate corresponding to the value of the uplink control information among the four candidates, and wherein the cyclic shift is based on a result obtained by multiplying a sum of the first index and the second index by $\pi/6$.

6. A system comprising:

a terminal that comprises:

a processor that controls a hopping of a cyclic shift by determining the cyclic shift based on a first index according to higher layer signaling, based on a value of uplink control information, based on a symbol index of an uplink control channel, and based on a cell ID; and a transmitter that transmits, in the uplink control channel a sequence obtained by the cyclic shift of a base sequence; and a base station that receives the uplink control information in the uplink control channel, wherein the value of the uplink control information is one of a first value, a second value, a third value, and a fourth value, the first value indicates 1-bit Hybrid Automatic Repeat request-Acknowledgement (HARQ-ACK), value 0 and negative Scheduling Request (SR), the second value indicates 1-bit HARQ-ACK value 0 and positive SR, the third value indicates 1-bit HARQ-ACK value 1 and negative SR, and the fourth value indicates 1-bit HARQ-ACK value 1 and positive SR, wherein the first value, the second value, the third value, and the fourth value correspond to four candidates of a second index, respectively, wherein the four candidates include 0, 3, 6, and 9, wherein the second index is one candidate corresponding to the value of the uplink control information among the four candidates, and wherein the cyclic shift is based on a result obtained by multiplying a sum of the first index and the second index by $\pi/6$.

\* \* \* \* \*